Figure 1:
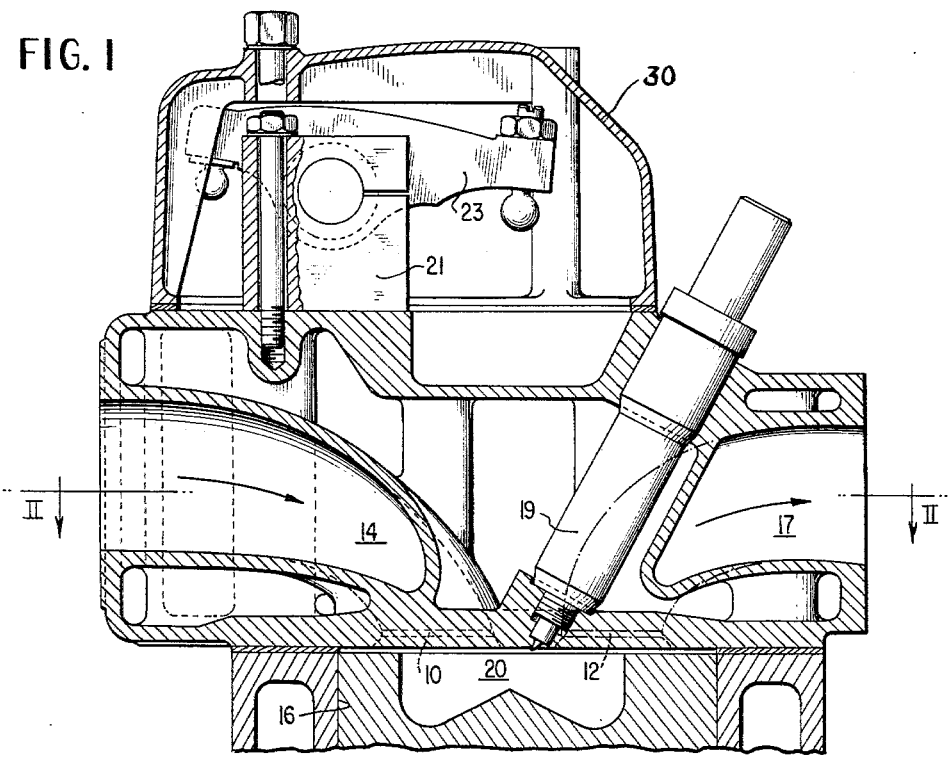

March 15, 1966 M. CHRISTIAN ETAL 3,240,190
INTERNAL COMBUSTION ENGINE
Filed Aug. 27, 1963 2 Sheets-Sheet 1

INVENTORS.
MANFRED CHRISTIAN
HERBERT SCHMIDT
ERWIN EISELE
BY
Dicke and Craig
ATTORNEYS.

March 15, 1966  M. CHRISTIAN ETAL  3,240,190
INTERNAL COMBUSTION ENGINE

Filed Aug. 27, 1963  2 Sheets-Sheet 2

INVENTORS.
MANFRED CHRISTIAN
HERBERT SCHMIDT
BY ERWIN EISELE
Dicke and Craig
ATTORNEYS.

United States Patent Office 3,240,190
Patented Mar. 15, 1966

3,240,190
INTERNAL COMBUSTION ENGINE
Manfred Christian, Berlin-Dahlem, Herbert Schmidt, Berlin-Mariendorf, and Erwin Eisele, Stuttgart, Germany, assignors to Daimler-Benz Aktiengesellschaft, Stuttgart-Unterturkheim, Germany
Filed Aug. 27, 1963, Ser. No. 304,905
Claims priority, application Germany, Aug. 31, 1962,
D 39,736
11 Claims. (Cl. 123—30)

The present invention relates to a cylinder head construction for internal combustion engines, especially Diesel engines, having four valves of which the two inlet valves and the two outlet valves are each adjacent one another and are disposed one behind the other in the main-supply direction of the combustion air, and with such a construction of the inlet channel system that the combustion air, as viewed in a plane extending transversely to the cylinder axis, flows at both inlet apertures in the same direction of rotation tangentially toward the cylinder space.

With similar prior art constructions, as exemplified by U.S. Patent 2,318,914, there is provided a wide unitary inlet channel which becomes narrower in the direction toward the cylinder inlet apertures and through which projects, within the area ahead of the inlet apertures, a guide body extending parallelly to the cylinder axis. Such an arrangement is unfavorable for two reasons: On the one hand, with connections, disposed one behind the other, of both inlet apertures with one and the same inlet channel, it is not possible to achieve a completely even distribution of the air quantity to the two inlet apertures, particularly not with different rotational speed, so that the total time cross section which is available, is not put to optimum use, and, on the other, it is not possible to impart an equally good tangential flow to the air quantity entering the cylinder space through the individual apertures since the respective main flow is disturbingly influenced by subsidiary flows of the main stream or flow essentially intended for the other aperture.

These disadvantages are completely avoided by the present invention. It is proposed in accordance with the present invention to provide two completely separate inlet channels which extend at first alongside one another within the same transverse cylinder plane parallelly to the straight line through the center of the two inlet apertures, and which in the further course thereof are bent toward one another in a staggered manner. In this manner a completely uniform distribution of the combustion air to both inlet apertures is achieved and a uniformly good tangential direction is imparted thereby to the combustion air with simplest possible structural expenses.

Since both inlet channels are curved toward one another, there results necessarily a certain spacing between the mutually facing walls thereof. This space, which extends approximately within the plane passing through the centers of the two cylinder inlet apertures and parallel to the cylinder axis, may be utilized with advantage for the guidance of the push rods for the inlet valve actuation and possibly also for a securing bolt for the cylinder head. The valve actuating mechanism is then best so arranged and constructed that the two inlet valves and the two outlet valves each are actuated by one push rod and one rocker arm, respectively, by way of a bridge structure whereby the two push rods are arranged on one side of the cylinder, preferably on the inlet side, adjacent one another.

Additionally, it is proposed in accordance with the present invention to provide also two completely separate outlet channels. This has the advantage that the gases flowing out through one valve do not disturb the flow at the other valve so that the flow energy of the exhaust gases may be utilized to better advantage in the interest of a scavenging effect.

In furtherance of a consistent construction of the entire cylinder head, it is additionally proposed in accordance with the present invention that the outlet channels, as viewed in a plane extending transversely to the cylinder axis, are arranged by about 180° axially symmetrically to the inlet channels. The space between the two outlet channels may thereby be utilized for guiding a securing bolt for the cylinder head.

It is further proposed in accordance with the present invention that a fuel injection nozzle be arranged, preferably inclined to the cylinder axis in the direction toward this axis, on the outlet side between the inlet and outlet channel. It is particularly advantageous if the injection nozzle is not located beneath the valve hood which covers the valve actuating mechanism. The nozzle is then easily accessible, and in case of break or leakage of the fuel line leading to the nozzle no fuel can reach the lubricating oil.

Accordingly, it is an object of the present invention to provide an internal combustion engine, and more particularly a cylinder head construction for an internal combustion engine of the type described hereinabove which eliminates the aforementioned disadvantages encountered with the prior art constructions by simple and effective means.

It is another object of the present invention to provide a cylinder head construction for a multi-valve internal combustion engine that assures a completely even distribution of the air quantities to the respective inlet apertures, and permits the imparting of an equally good tangential flow direction to the inflowing quantity of combustion air entering through the individual apertures.

A further object of the present invention resides in the provision of a cylinder head structure for a multi-valve internal combustion engine which utilizes in an optimum manner the available cross-sectional areas and prevents any mutual interference between the air flows to the respective inlet apertures with an extremely simple and efficient construction.

A still further object of the present invention resides in the provision of a cylinder head structure for an internal combustion engine of the type described hereinabove which permits an advantageous accommodation of the valve actuating mechanisms as well as of securing bolts used for securing the cylinder head to the cylinder.

Still another object of the present invention resides in the provision of a cylinder head structure in which individual outlet channels are utilized for the better utilization of the flow energy of the exhaust gases in the interest of a good scavenging effect.

Another object of the present invention resides in the provision of a cylinder head structure which permits an arrangement of the injection nozzle in such a manner that it is readily accessible without removing the hood covering the valve actuating mechanism, and which also prevents, in case of leakage in the fuel line, any mixing of the fuel with the lubricating oil.

Figure 2:
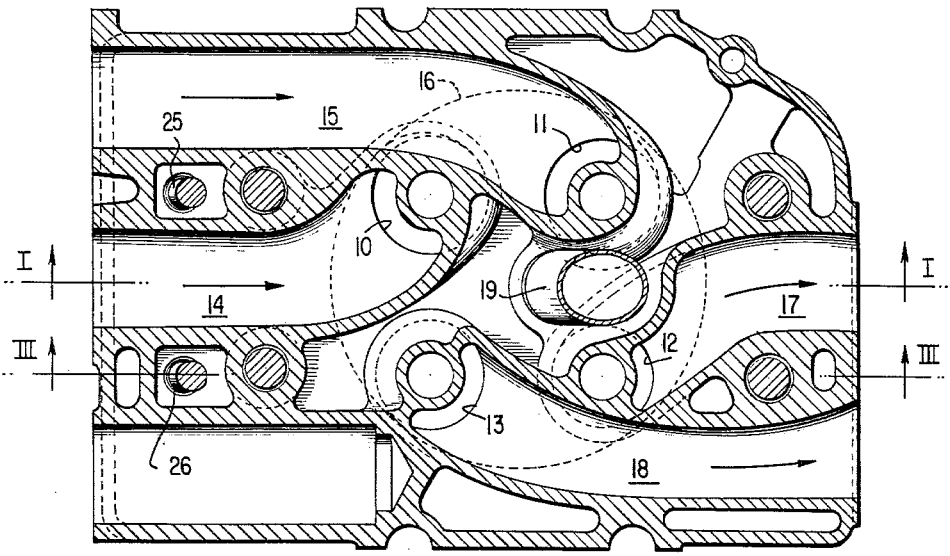
Figure 3:
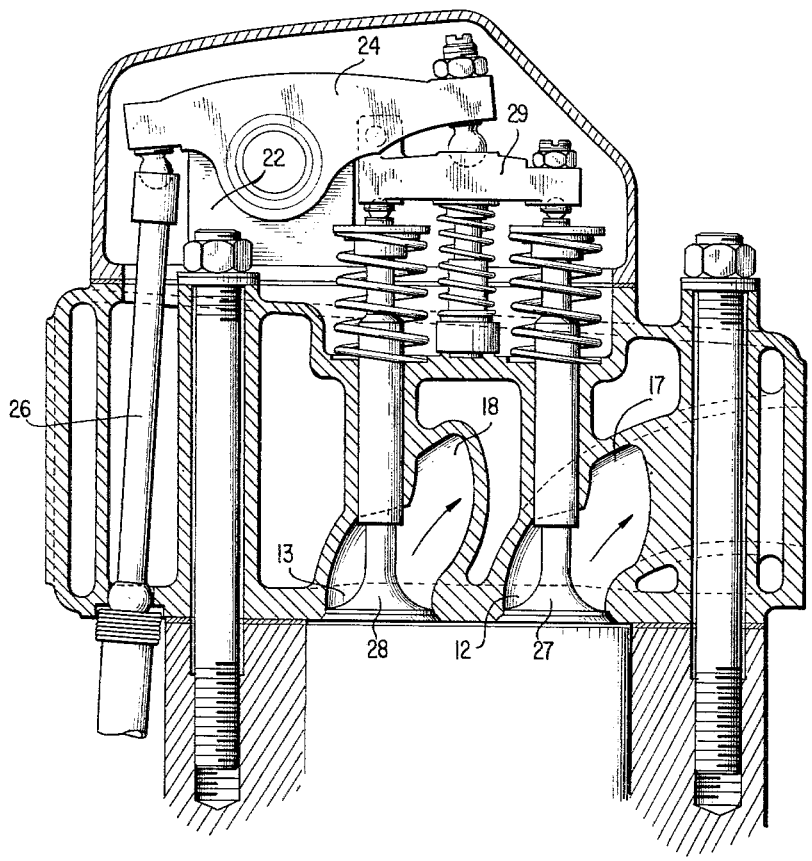

These and further objects, features and advantages of the present invention will become more obvious from the following description when taken in connection with the accompanying drawing which show, for purposes of illustration only, one embodiment in accordance with the present invention and wherein:

FIGURE 1 is a longitudinal center cross-sectional view through a Diesel engine cylinder head structure in accordance with the present invention, taken along line I—I of FIGURE 2, FIGURE 2 is a transverse cross-sectional view through the cylinder head of FIGURE 1, taken along line II—II of FIGURE 1, and FIGURE 3 is a longitudinal cross-sectional view through the cylinder head structure of FIGURES 1 and 2, taken along line III—III of FIGURE 2, and illustrating the valve actuating mechanism and accommodation thereof in accordance with the present invention.

Referring now to the drawing wherein like reference numerals are used throughout the various views to designate like parts, reference numerals 10 and 11 designate two inlet apertures located in the end wall of the cylinder head facing the cylinder and reference numerals 12 and 13 two outlet apertures provided in the same end wall of the cylinder head. The inlet channels 14 and 15 leading to the inlet apertures 10 and 11 initially extend parallelly to each other and thereafter, as shown in FIGURE 2, are bent continuously and staggered in an arc in the direction toward the inlet apertures 10 and 11, respectively, where the two inlet channels have reached a tangential direction in relation to the cylinder 16. The outlet channels 17 and 18 assume axially symmetrically a similar configuration.

A fuel injection nozzle 19 is arranged at an inclination between the end of the inlet channel 15 and the beginning of the outlet channel 17 which nozzle 19 injects fuel into a piston combustion space 20 within which, owing to the tangential direction of the end of the inlet channels 14 and 15, there exists a vortexing or eddying movement of the air about the cylinder axis.

Rocker arms 23 and 24 for the actuation of the inlet and outlet valves are supported on lugs or supports 21 and 22 secured at the cylinder head. The rocker arms 23 and 24 are actuated from a lower cam shaft (not shown) by way of push rods 25 and 26 of which the push rod 25 extends through the cylinder head within a hollow space disposed between the walls of the inlet channels 14 and 15. The individual valve shafts are actuated from the rocker arms 23 and 24 by way of bridge structures; FIGURE 3 illustrates the bridge structure 29 for the outlet valves 27 and 28, and a similar bridge structure is provided for the inlet valves. The hood member closing the valve actuating mechanism is designated in FIGURES 1 and 3 by reference numeral 30. It can be readily seen from FIGURE 1 that the injection nozzle 19 is accommodated in the cylinder head structure in such a manner that servicing thereof does not require removal of the cover 30. It is also obvious from FIGURES 1 and 2 that in case of leaks in the fuel line and/or in the injection nozzle 19, leakage of fuel into the lubricating oil utilized with the valve actuating mechanism is practically impossible.

While we have shown and described one embodiment in accordance with the present invention it is understood that the same is not limited thereto but is susceptible of numerous changes and modifications within the spirit and scope thereof and we therefore do not wish to be limited to the details shown and described herein but intend to cover all such changes and modifications as are encompassed by the scope of appended claims.

We claim:

1. A cylinder head structure for internal combustion engines, especially Diesel engines, with four valves for each cylinder, of which two inlet and two outlet valves are disposed respectively adjacent one another and behind one another substantially in the main supply direction of the combustion air, comprising:
    two completely separate inlet channels which extend substantially entirely within the same cylinder transverse plane substantially parallelly to the straight line through the centers of the two inlet apertures adjacent one another and in the further course thereof adjacent said cylinder are curved toward each other in said transverse plane in a staggered manner whereby the combustion air, as viewed in a plane extending transversely to the cylinder axis, is supplied at both inlet apertures in the same direction of rotation substantially tangentially to the cylinder space.

2. A cylinder head structure for internal combustion engines, especially Diesel engines, with four valves and valve-actuating means, of which two inlet and two outlet valves are disposed respectively adjacent one another and behind one another substantially in the main supply direction of the combustion air, comprising:
    two completely separate inlet channels which extend at first within the same cylinder transverse plane substantially parallelly to the straight line through the centers of the two inlet apertures adjacent one another and in the further course thereof are curved toward each other in said transverse plane in a staggered manner whereby the combustion air, as viewed in a plane extending transversely to the cylinder axis, is supplied at both inlet apertures in the same direction of rotation substantially tangentially to the cylinder space,
    the space formed between the two inlet channels serving for the accommodation of a push rod forming part of the inlet valve-actuating means and for securing bolt means for the cylinder head structure.

3. A cylinder head structure for internal combustion engines, especially Diesel engines, with four valves and valve-actuating means for each cylinder, of which two inlet and two outlet valves are disposed respectively adjacent one another and behind one another substantially in the main supply direction of the combustion air, comprising:
    two completely separate inlet channels which extend substantially entirely within the same cylinder transverse plane substantially parallelly to the straight line through the centers of the two inlet apertures adjacent one another and in the further course thereof adjacent said cylinder are curved toward each other in said transverse plane in a staggered manner whereby the combustion air, as viewed in a plane extending transversely to the cylinder axis, is supplied at both inlet apertures in the same direction of rotation substantially tangentially to the cylinder space.
    the space formed between the two inlet channels serving for the accommodation of a push rod forming part of the inlet valve-actuating means and for securing bolt means for the cylinder head structure,
    said valve-actuating means including, for each of two inlet valves and two outlet valves, one push rod, one rocker arm and one bridge structure, respectively, the two inlet valves and the two outlet valves being each actuated from one push rod and one rocker arm by way of a bridge structure, respectively, and both push rods being disposed on the inlet side of the cylinder adjacent one another.

4. A cylinder head structure for internal combustion engines, especially Diesel engines, with four valves for each cylinder, of which two inlet and two outlet valves are disposed respectively adjacent one another and substantially behind one another in the main supply direction of the combustion air, comprising:
    two completely separate inlet channels which extend substantially entirely within the same cylinder transverse plane substantially parallelly to the straight line through the center of the two inlet apertures and adjacent one another and in the further course thereof adjacent said cylinder are curved toward each other in said transverse plane in a staggered manner whereby the combustion air, as viewed in a plane extending transversely to the cylinder axis, is supplied at both inlet apertures in the same direction of rotation substantially tangentially to the cylinder space,
    and two completely separate outlet channels in said cylinder head structure leading to the two outlet valves respectively.

5. A cylinder head structure for internal combustion engines, especially Diesel engines, with four valves, of which two inlet and two outlet valves are disposed respectively adjacent one another and substantially behind one another in the main supply direction of the combustion air, comprising:

two completely separate inlet channels which extend at first within the same cylinder transverse plane substantially parallelly to the straight line through the centers of the two inlet apertures and adjacent one another and in the further course thereof are curved toward each other in a staggered manner whereby the combustion air, as viewed in a plane extending transversely to the cylinder axis, is supplied at both inlet apertures in the same direction of rotation substantially tangentially to the cylinder space, and two completely separate outlet channels in said cylinder head structure leading to the two outlet valves, respectively, the space between the two outlet channels serving for the accommodation of securing bolt means for the cylinder head structure.

6. A cylinder head structure for internal combustion engines, especially Diesel engines, with four valves, of which two inlet and two outlet valves are disposed respectively adjacent one another and substantially behind one another in the main supply direction of the combustion air, comprising:

two completely separate inlet channels which extend at first within the same cylinder transverse plane substantially parallel to the straight line through the centers of the two inlet apertures and adjacent one another and in the further course thereof are curved toward each other in a staggered manner whereby the combustion air, as viewed in a plane extending transversely to the cylinder axis, is supplied at both inlet apertures in the same direction of rotation substantially tangentially to the cylinder space, and two completely separate outlet channels in said cylinder head structure leading to the two outlet valves, respectively, the space between the two outlet channels serving for the accommodation of securing bolt means for the cylinder head structure, and the outlet channels, as viewed in a plane extending transversely to the cylinder axis, extending substantially axially symmetrically to the inlet channels by about 180°.

7. A cylinder head structure for internal combustion engines, especially Diesel engines, with four valves for each cylinder, of which two inlet and two outlet valves are disposed respectively adjacent one another and substantially behind one another in the main supply direction of the combustion air, comprising:

two completely separate inlet channels which extend substantially entirely within the same cylinder transverse plane substantially parallelly to the straight line through the centers of the two inlet apertures and adjacent one another and in the further course thereof adjacent said cylinder are curved toward each other in said transverse plane in a staggered manner whereby the combustion air, as viewed in a plane extending transversely to the cylinder axis, is supplied at both inlet apertures in the same direction of rotation substantially tangentially to the cylinder space, and two completely separate outlet channels in said cylinder head structure leading to the two outlet valves, respectively, and the outlet channels, as viewed in a plane extending transversely to the cylinder axis, extending substantially axially symmetrically to the inlet channels by about 180°.

8. A cylinder head structure for internal combustion engines, especially Diesel engines, with four valves for each cylinder, of which two inlet and two outlet valves are disposed respectively adjacent one another and substantially behind one another in the main supply direction of the combustion air, comprising:

two completely separate inlet channels which extend substantially entirely within the same cylinder transverse plane substantially parallelly to the straight line through the centers of the two inlet apertures and adjacent one another and in the further course thereof adjacent said cylinder are curved toward each other in said transverse plane in a staggered manner whereby the combustion air, as viewed in a plane extending transversely to the cylinder axis, is supplied at both inlet apertures in the same direction of rotation substantially tangentially to the cylinder space, and fuel injection nozzle means arranged on the outlet side of the cylinder head structure between the respective inlet and outlet channels.

9. A cylinder head structure for internal combustion engines, especially Diesel engines, with four valves and valve actuating means for each cylinder, of which two inlet and two outlet valves are disposed respectively adjacent one another and behind one another substantially in the main supply direction of the combustion air, comprising:

two completely separate inlet channels which extend substantially entirely within the same cylinder transverse plane substantially parallelly to the straight line through the centers of the two inlet apertures adjacent one another and in the further course thereof adjacent said cylinder are curved toward each other in said transverse plane in a staggered manner whereby the combustion air, as viewed in a plane extending transversely to the cylinder axis, is supplied at both inlet apertures in the same direction of rotation substantially tangentially to the cylinder space, the space formed between the two inlet channels serving for the accommodation of a push rod forming part of the inlet valve actuating means and for securing bolt means for the cylinder head structure, said valve actuating means including, for each of two inlet valves and two outlet valves, one push rod, one rocker arm and one bridge structure, respectively, the two inlet valves and the two outlet valves being each actuated from one push rod and one rocker arm by way of a bridge structure, respectively, and both push rods being disposed on the inlet side of the cylinder adjacent one another, two completely separate outlet channels in said cylinder head structure leading to the two outlet valves, respectively, the space between the two outlet channels serving for the accommodation of securing bolt means for the cylinder head structure, the outlet channels, as viewed in a plane extending transversely to the cylinder axis, extending axially symmetrically to the inlet channels by about 180°, fuel injection nozzle means disposed obliquely to the cylinder axis in a direction toward said axis and arranged on the outlet side of the cylinder head structure between the respective inlet and outlet channels, and hood means for said valve actuating means, said fuel injection nozzle means being disposed adjacent said hood means.

10. A cylinder head structure for internal combustion engines, especially Diesel engines, with four valves for each cylinder, of which two inlet and two outlet valves are disposed respectively adjacent one another and substantially behind one another in the main supply direction of the combustion air, comprising:

two completely separate inlet channels which extend substantially entirely within the same cylinder transverse plane substantially parallelly to the straight line through the centers of the two inlet apertures and adjacent one another and in the further course thereof adjacent said cylinder are curved toward each other in said transverse plane in a staggered manner whereby the combustion air, as viewed in a plane extending transversely to the cylinder axis, is supplied at both inlet apertures in the same direction of rotation substantially tangentially to the cylinder space, two completely separate outlet channels in said cylinder head structure leading to the two outlet valves, respectively, and fuel injection nozzle means arranged on the outlet side of the cylinder head structure between the respective inlet and outlet channels.

11. A cylinder head structure for internal combustion engines, especially Diesel engines, with four valves for each cylinder, of which two inlet and two outlet valves are disposed respectively adjacent one another and behind one another substantially in the main supply direction of the combustion air, comprising:

two completely separate inlet channels which extend substantially entirely within the same cylinder transverse plane substantially parallelly to the straight line through the centers of the two inlet apertures adjacent one another and in the further course thereof adjacent said cylinder are curved toward each other in said transverse plane in a staggered manner whereby the combustion air, as viewed in a plane extending transversely to the cylinder axis, is supplied at both inlet apertures in the same direction of rotation substantially tangentially to the cylinder space, two completely separate outlet channels in said cylinder head structure leading to the two outlet valves, respectively, the space between the two outlet channels serving for the accommodation of securing bolt means for the cylinder head structure, the outlet channels, as viewed in a plane extending transversely to the cylinder axis, extending axially symmetrically to the inlet channels by about 180°, fuel injection nozzle means disposed obliquely to the cylinder axis in a direction toward said axis and arranged on the outlet side of the cylinder head structure between the respective inlet and outlet channels, and hood means for said valve actuating means, said fuel injection nozzle means being disposed adjacent said hood means.

References Cited by the Examiner

UNITED STATES PATENTS

| | | | |
|---|---|---|---|
| 2,269,104 | 1/1942 | Hedlund | 123—30.2 |
| 2,318,914 | 5/1943 | Anderson et al. | 123—30.2 |
| 2,610,617 | 9/1952 | Pielstick | 123—90 |
| 3,045,655 | 7/1962 | Formia | 123—191 |
| 3,054,390 | 9/1962 | Meurer et al. | 123—30.2 |
| 3,125,075 | 3/1964 | Wittek | 123—101 |

FOREIGN PATENTS 868,525  5/1961  Great Britain.

OTHER REFERENCES

German application No. 1,032,972, printed Oct. 29, 1953 (Augsburg).

MARK NEWMAN, *Primary Examiner.*

RICHARD B. WILKINSON, *Examiner.*